June 10, 1947. V. N. IPATIEFF ET AL 2,421,946
POLYMERIZATION OF OLEFINIC HYDROCARBONS
Filed June 30, 1945
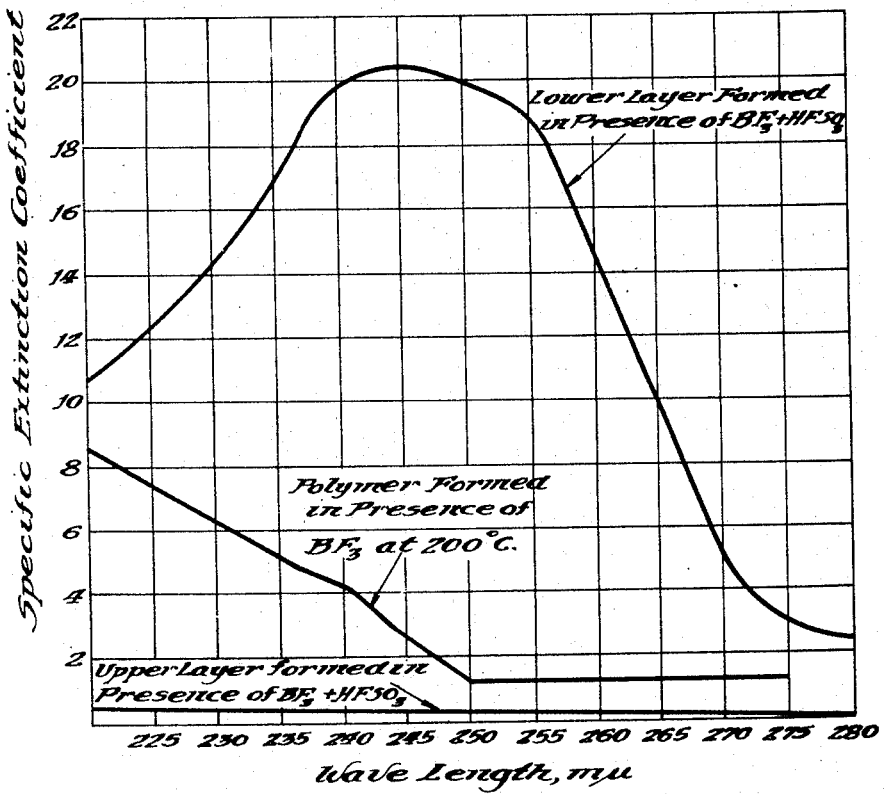
Inventors:
Vladimir N. Ipatieff
Carl B. Linn
By: Lee J. Gary
Attorney Patented June 10, 1947

2,421,946

UNITED STATES PATENT OFFICE 2,421,946

POLYMERIZATION OF OLEFINIC HYDROCARBONS

Vladimir N. Ipatieff, Chicago, and Carl B. Linn, Riverside, Ill., assignors to Universal Oil Products Company, Chicago, Ill., a corporation of Delaware Application June 30, 1945, Serial No. 602,608

10 Claims. (Cl. 260—683.15)

This invention relates to the polymerization of olefinic hydrocarbons in the presence of a particular type of catalyst. More particularly, this invention relates to the polymerization of ethylene and of other gaseous olefins into normally liquid hydrocarbons boiling within the approximate range of gasoline.

An object of this invention is to produce normally liquid hydrocarbons by catalytically polymerizing ethylene and higher olefins.

Another object of this invention is to polymerize mono-olefinic hydrocarbons in the presence of a catalyst comprising essentially boron trifluoride and fluorosulfonic acid.

One embodiment of this invention relates to a process which comprises reacting an olefinic hydrocarbon at polymerizing conditions in the presence of boron trifluoride and fluorosulfonic acid.

Another embodiment of this invention relates to a polymerization process which comprises reacting a normally gaseous olefinic hydrocarbon at polymerizing conditions in the presence of boron trifluoride and fluorosulfonic acid.

A further embodiment of this invention relates to a process which comprises polymerizing ethylene to normally liquid hydrocarbons in the presence of a catalyst comprising essentially boron trifluoride and fluorosulfonic acid.

The catalyst mixtures hereinafter indicated are especially adapted to permit the controlled polymerization of ethylene and other olefinic hydrocarbons.

Normally gaseous and liquid olefinic hydrocarbons which are polymerizable by the process of the present invention occur together with paraffinic or saturated hydrocarbons in commercial hydrocarbon mixtures such as those encountered in the cracking of petroleum, in gas making processes, and as by-products of various chemical industries. Normally gaseous mono-olefins, such as ethylene, propylene and butylenes, and normally liquid olefins including amylenes, hexenes and higher olefins, may be obtained also by catalytic dehydrogenation of paraffins, by pyrolysis of certain paraffinic hydrocarbons, and by dehydration of alcohols. Polyolefins and cyclic olefins are also olefinic hydrocarbons which may be polymerized in our process and these hydrocarbons include particularly butadiene, isoprene, cyclohexene, alkyl cyclohexenes, and cyclopentene hydrocarbons.

It is known that ethylene does not polymerize at a moderate temperature in the presence of pure boron trifluoride. Known promoters for ethylene polymerization in the presence of boron trifluoride include nickel powder, water, and hydrogen fluoride. Now we have found that ethylene will undergo substantially complete conversion into normally liquid hydrocarbons even at a temperature of about 20° C. in the presence of boron trifluoride and fluorosulfonic acid. This process and these composite catalysts are also effective for converting propylene and butylenes into normally liquid polymers, and for converting amylenes, hexylenes, and higher olefins into their dimers, trimers and higher polymers. Propylene and butylenes so polymerized may occur in the gases derived from oil cracking processes or they may be produced in relatively pure state by special means as by the dehydration of alcohols or by the dehydrogenation and fractionation of selected hydrocarbon mixtures. Some polymerization of propylene and butylenes occurs in the presence of pure boron trifluoride, but we prefer to employ boron trifluoride together with fluorosulfonic acid.

The present process is particularly useful for the production of polymers containing from about 6 to about 12 carbon atoms per molecule from ethylene and also from propylene and butylenes. The preferred polymer products boil at temperatures within the approximate boiling range of commercial gasolines. These polymers containing from about 6 to about 12 carbon atoms per molecule are useful for blending with straight-run gasoline to increase its antiknock value.

Boron trifluoride alone has been used to catalyze the polymerization of isobutylene and other olefinic hydrocarbons at relatively low temperatures in the neighborhood of —100° C. to produce high molecular weight polymers utilizable as synthetic elastomers. We have found, however, that at higher temperatures normally liquid hydrocarbons are produced from normally gaseous olefins in the presence of a composite catalyst comprising essentially boron trifluoride and fluorosulfonic acid.

At a pressure of 1 atmosphere, boron trifluoride is a colorless gas having a boiling point of —101° C.

One method of preparing fluorosulfonic acid useful in our process consists in treating fluorspar ($CaF_2$) with fuming sulfuric acid (50–60% $SO_3$). It is a mobile liquid with a boiling point of 163° C. and a slightly pungent odor but with substantially no harmful action on dry skin. It feels greasy to the touch and is without the intense blistering action of anhydrous hydrogen fluoride.

While the polymerization reaction of our process occurs rapidly at a temperature of from about 20° to about 200° C., it may also be carried out at a temperature of from about −50° to about 250° C. and at a pressure of from about 1 to about 70 atmospheres or more. Our polymerization process may be carried out in batch operation or preferably in continuous operation. The reaction may be carried out continuously by passing a mixture of an olefin, such as ethylene, together with boron trifluoride and fluorosulfonic acid through a suitable reactor containing agitating or mixing means, separating liquid hydrocarbon products from the catalyst, and recycling the recovered catalyst and any unreacted ethylene or other olefinic hydrocarbons undergoing treatment.

In another type of operation a polymerization reactor may be used comprising a mechanically agitated reaction zone through which a proportioned mixture of olefinic hydrocarbons and the aforementioned catalyst mixture is passed. The reaction mixture is withdrawn from the reactor at approximately the same rate as that at which the fresh olefin-containing hydrocarbon charging stock and catalyst are introduced thereto. It will usually be necessary to incorporate a cooling zone or other heat exchange means in the polymerization zone or between such zones if a multiple polymerization reactor system is employed.

Continuous polymerization treatment may also be achieved by an arrangement of apparatus wherein liquid fluorosulfonic acid flows downwardly through a contacting tower and therein encounters ethylene, or another olefin, and boron trifluoride ascending through the tower. The catalyst layer at the bottom of this polymerization tower, which would accordingly contain a substantial proportion of boron trifluoride, is recycled to the top of the tower for reuse and any unreacted ethylene (or other olefin) and/or boron trifluoride escaping from the top of the tower are returned and introduced at the bottom of the tower. Liquid polymers are then withdrawn at a suitable point or group of points in the polymerization tower. Other means of continuous contacting of an olefinic hydrocarbon with the catalyst mixture will also be apparent to those skilled in the art.

The liquid product formed in typical polymerization runs on ethylene contain 50% by volume of hydrocarbons boiling in the gasoline boiling range, said hydrocarbons being substantialy saturated in character and of high octane number. Isobutane is also found as a reaction product in an amount up to 5% of the total ethylene reacted. Other hydrocarbon materials boiling higher than gasoline have utility as lubricating oil and as intermediates for the preparation of detergents and wetting agents. Other high boiling and highly unsaturated hydrocarbons which are made in the process and sometimes referred to as "sludge hydrocarbons" or "organic diluent" are useful as intermediates in the manufacture of drying oils, resins, plastics and paints.

Accordingly, the present invention deals with an olefin polymerization process in which the polymerizing activity of boron trifluoride is modified by the addition thereto of fluorosulfonic acid which produces a composite catalyst sufficiently active to promote the polymerization of ethylene and higher olefins at relatively moderate reaction temperatures to form substantial yields of relatively low-boiling but normally liquid hydrocarbon products. In fact, the polymers formed in the presence of our mixed catalyst, comprising boron trifluoride and fluorosulfonic acid, differ considerably from polymers formed from the same olefinic charging stock but at a much higher temperature in the presence of only boron trifluoride. In the presence of our mixed catalysts, olefinic hydrocarbons, including ethylene, are converted into mixtures of substantially saturated and highly unsaturated hydrocarbons. The substantially saturated hydrocarbons are present in a so-called upper layer, while the highly unsaturated hydrocarbons are admixed with the catalyst in a so-called lower layer. The hydrocarbons recovered from the so-called lower layer are similar to those produced by a conjunct polymerization reaction by which a complex mixture of hydrocarbons is formed containing paraffins, olefins, cyclic hydrocarbons and a relatively high proportion of conjugated diolefins. The presence of conjugated diolefins in such polymer products is evidenced by the so-called "specific extinction coefficient" obtained by ultra-violet absorption analysis of the hydrocarbon products.

In order to interpret the results of these ultra-violet absorption analyses, use is made of the "specific extinction coefficient," which is equal to $$\frac{\log_{10} \frac{I_0}{I}}{CL}$$

where $I_0$ = intensity of incident light (cell filled with iso-octane)
$I$ = intensity of transmitted light (cell filled with solution of polymer in iso-octane solvent)
$C$ = concentration of polymer in cell in grams per liter
$L$ = length of cell path in centimeters Iso-octane, more exactly known as 2,2,4-trimethylpentane, is employed as the solvent since this octane gives substantially no ultra-violet absorption in the region examined.

Other work on various hydrocarbons of known structures has indicated that a high specific extinction coefficient in the region around 250 m$\mu$ denotes the presence in said hydrocarbons of a relatively high proportion of conjugated unsaturation.

The following example is given to indicate the results obtained by the present process, although with no intention of limiting the scope of the invention in exact correspondence with the numerical results presented.

A rotatable steel autoclave of 850 cc. capacity was charged with 32 grams of boron trifluoride and 155 grams of ethylene, the pressure within the autoclave being 1130 pounds per square inch at 25° C. The autoclave was then rotated at 25° C. for 3 hours during which time the pressure remained constant and accordingly indicated that no reaction was occurring. Then, the autoclave was heated to 150° C. and maintained at that temperature for 4 hours during which time the pressure changed from 2600 pounds per square inch to 1920 pounds per square inch and after cooling to 25° C., the pressure was 840 pounds per square inch. Without opening the autoclave it was then heated to 200° C. and kept at that temperature for 10 hours while the pressure decreased from 1700 pounds per square inch to 490 pounds per square inch, the final pressure at 25° C. being 210 pounds per square inch. The pressure within the autoclave was then decreased by releasing the gaseous material through a dry ice trap and scrubber containing caustic soda solution to a gas holder.

The reaction mixture so recovered consisted of 26 grams of boron trifluoride, 1 gram of ethylene, 139 grams of an upper layer, 8 grams of a lower layer and 1 gram of condensible gas. The liquid upper layer which had an average bromine number of 49 contained 19% by weight of hydrocarbons boiling up to 200° C. This fraction which was colorless was saturated to nitrating mixture. The portion of the upper layer of hydrocarbons boiling above 200° C. had the appearance of lubricating oil and had a refractive index, $n_D^{20}$, of 1.4678 and a specific gravity of 0.8368 at 20° C. This high boiling material reacted violently with nitrating mixture, thus indicating the presence of highly unsaturated hydrocarbons. The total upper layer recovered from the polymerization reaction was analyzed by ultra-violet absorption methods to give the data which are shown in Table I and in the attached drawing.

TABLE I

*Ultra-violet absorption analysis of polymer formed from ethylene in the presence of boron trifluoride*

| Wave Length, mμ | Specific Extinction Coefficient |
|---|---|
| 220 | 8.3 |
| 225 | 7.4 |
| 230 | 6.3 |
| 235 | 5.1 |
| 240 | 4.3 |
| 245 | 2.5 |
| 250 | 1.2 |
| 255 | 1.1 |
| 260 | 1.1 |
| 265 | 1.2 |
| 270 | 1.2 |
| 275 | 1.1 |

This run in which ethylene was heated in the presence of boron trifluoride alone showed that ethylene does not polymerize at 25° C. in the presence of this catalyst, but that polymerization does occur at a moderate rate at a temperature in the range of about from 150° to about 250° C. In this polymerization treatment very little lower layer was formed and over 80% of the boron trifluoride charged was recovered at the end of the run. The low-boiling product was substantially saturated and appeared to be formed by a typical conjunct polymerization reaction.

A similar run was made on the polymerization of ethylene in the presence of a mixture of boron trifluoride and fluorosulfonic acid. In this run the autoclave of 850 cc. capacity was charged with 135 grams of ethylene, 72 grams of boron trifluoride and 20 grams of fluorosulfonic acid. The autoclave was maintained at a temperature of 25° to 35° C. while the ethylene was added gradually over a time of 4 hours at a pressure of from about 200 pounds to about 800 pounds per square inch. The autoclave was then maintained at this temperature and the stirring by rotation was continued for 4 hours after introduction of the ethylene. The reaction products, recovered as indicated above for the run on ethylene polymerization in the presence of boron trifluoride alone, consisted of 17 grams of recovered boron trifluoride, 5 grams of unconverted ethylene and 50 grams of an upper hydrocarbon layer with a bromine number of 7, and 130 grams of a lower layer containing hydrocarbons with an average bromine number of 107. The 130 grams of lower layer were found to contain 43 grams of hydrocarbons.

Ultra-violet absorption analyses of hydrocarbons present in the upper and lower layers so recovered in this run are given in Table II.

TABLE II

*Ultra-violet absorption analysis of hydrocarbons in upper and lower layers formed from ethylene in the presence of boron trifluoride and fluorosulfonic acid*

| Wave Length, mμ | Specific Extinction Coefficient | |
|---|---|---|
| | Upper Layer | Lower Layer |
| 220 | .4 | 10.8 |
| 225 | .3 | 12.2 |
| 230 | .3 | 14.3 |
| 235 | .3 | 17.2 |
| 240 | .3 | 20.0 |
| 245 | .3 | 21.8 |
| 250 | .3 | |
| 255 | .3 | 19.0 |
| 260 | .2 | 14.8 |
| 265 | .2 | |
| 270 | .1 | 4.8 |
| 275 | 0 | |
| 280 | 0 | 2.4 |

The results of the ultra-violet absorption analyses given in Table II and in the attached drawing show that the upper layer contained substantially none of the highly unsaturated hydrocarbon mixture sometimes referred to as "sludge hydrocarbons" or "organic diluent." However, the hydrocarbon mixture recovered from the lower layer had a high specific extinction coefficient and thus gave indications of a high concentration of organic diluent comprising highly unsaturated hydrocarbons.

The foregoing specification and examples indicate the character of the process of the present invention and the nature of results obtained, although neither section is introduced to unduly limit the generally broad scope of the invention.

We claim as our invention:

1. A process for producing hydrocarbons of higher molecular weight which comprises polymerizing an olefinic hydrocarbon in the presence of boron trifluoride and fluorosulfonic acid.

2. A process for producing hydrocarbons of higher molecular weight which comprises polymerizing an olefinic hydrocarbon at a temperature of from about −50° to about 250° C. in the presence of boron trifluoride and fluorosulfonic acid.

3. A process for producing hydrocarbons of higher molecular weight which comprises polymerizing a mono-olefinic hydrocarbon in the presence of boron trifluoride and fluorosulfonic acid.

4. A process for producing hydrocarbons of higher molecular weight which comprises polymerizing a mono-olefinic hydrocarbon at a temperature of from about −50° to about 250° C. in the presence of boron trifluoride and fluorosulfonic acid.

5. A process for producing hydrocarbons of higher molecular weight which comprises polymerizing a mono-olefinic hydrocarbon at a temperature of from about 20° to about 200° C. in the presence of boron trifluoride and fluorosulfonic acid.

6. A process for producing hydrocarbons of higher molecular weight which comprises polymerizing a normally gaseous olefin at a temperature of from about −50° to about 250° C. in the presence of boron trifluoride and fluorosulfonic acid.

7. A process for producing hydrocarbons of higher molecular weight which comprises polymerizing ethylene at a temperature of from about −50° to about 250° C. in the presence of boron trifluoride and fluorosulfonic acid.

8. A process for producing hydrocarbons of higher molecular weight which comprises polymerizing an olefinic hydrocarbon having at least 3 carbon atoms per molecule at a temperature of from about −50° to about 250° C. in the presence of boron trifluoride and fluorosulfonic acid.

9. A process for producing hydrocarbons of higher molecular weight which comprises polymerizing ethylene at a temperature of from about 20° to about 200° C. in the presence of boron trifluoride and fluorosulfonic acid.

10. A process for producing hydrocarbons of higher molecular weight which comprises polymerizing ethylene at a temperature of from about 20° to about 200° C. and at a pressure of from about 1 to about 70 atmospheres in the presence of boron trifluoride and fluorosulfonic acid.

VLADIMIR N. IPATIEFF.
CARL B. LINN.

REFERENCES CITED

The following references are of record in the file of this patent:

UNITED STATES PATENTS

| Number | Name | Date |
|---|---|---|
| 2,366,731 | Ipatieff et al. | Jan. 9, 1945 |
| 2,220,307 | Whiteley et al. | Nov. 5, 1940 |